US012559086B2

(12) United States Patent
Kaji et al.

(10) Patent No.: US 12,559,086 B2
(45) Date of Patent: Feb. 24, 2026

(54) CONTROL DEVICE FOR HYBRID VEHICLE

(71) Applicant: TOYOTA JIDOSHA KABUSHIKI KAISHA, Toyota (JP)

(72) Inventors: Fumiya Kaji, Numazu (JP); Michio Yoshida, Susono (JP); Kazunori Toida, Susono (JP); Shinya Asaura, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/653,039

(22) Filed: May 2, 2024

(65) Prior Publication Data

US 2024/0391450 A1 Nov. 28, 2024

(30) Foreign Application Priority Data

May 24, 2023 (JP) ................................ 2023-085744

(51) Int. Cl.
*B60W 10/06* (2006.01)
*B60W 10/02* (2006.01)
*B60W 10/08* (2006.01)
*B60W 10/30* (2006.01)
*B60W 20/00* (2016.01)

(52) U.S. Cl.
CPC .......... *B60W 20/00* (2013.01); *B60W 10/024* (2020.02); *B60W 10/06* (2013.01); *B60W 10/08* (2013.01); *B60W 10/30* (2013.01); *B60W 2520/10* (2013.01)

(58) Field of Classification Search
CPC .... B60W 10/024; B60W 20/00; B60W 20/40; B60W 10/06; B60W 10/30; B60W 10/08; B60W 2520/10; Y02T 10/62
See application file for complete search history.

(56) References Cited

U.S. PATENT DOCUMENTS

| | | | | |
|---|---|---|---|---|
| 7,316,283 | B2 * | 1/2008 | Yamamoto | B60L 50/61 477/34 |
| 8,540,602 | B2 * | 9/2013 | Ishikawa | B60W 10/08 180/65.265 |
| 9,669,837 | B2 * | 6/2017 | Ito | B60W 10/026 |
| 10,124,796 | B2 * | 11/2018 | Morita | B60W 10/06 |
| 10,351,015 | B2 * | 7/2019 | Kato | B60W 30/18127 |
| 10,518,766 | B2 * | 12/2019 | Hata | B60W 30/045 |
| 10,525,972 | B2 * | 1/2020 | Inoue | F16D 48/062 |

(Continued)

FOREIGN PATENT DOCUMENTS

| | | |
|---|---|---|
| JP | 2011105275 A | 6/2011 |
| JP | 2015229488 A | 12/2015 |

(Continued)

OTHER PUBLICATIONS

Perkins et al., An assessment of accessory loads in a hybrid electric vehicle, 2011, IEEE, p. 1-6 (Year: 2011).*

(Continued)

*Primary Examiner* — McDieunel Marc
(74) *Attorney, Agent, or Firm* — Dickinson Wright, PLLC

(57) ABSTRACT

A control device, for a hybrid vehicle including an engine, a torque converter, a transmission, a motor, a mechanical oil pump, and a starter, includes a traveling mode determination unit, an acquisition unit, a vehicle speed determination unit, and a control unit.

4 Claims, 3 Drawing Sheets

(56) References Cited

U.S. PATENT DOCUMENTS

| | | | | |
|---|---|---|---|---|
| 11,498,549 | B2 * | 11/2022 | Muta | B60W 20/40 |
| 2008/0156406 | A1 * | 7/2008 | Breed | B60C 23/0433 |
| | | | | 152/415 |
| 2008/0161989 | A1 * | 7/2008 | Breed | G07C 5/008 |
| | | | | 701/31.4 |
| 2011/0120789 | A1 | 5/2011 | Teraya | |
| 2014/0250990 | A1 * | 9/2014 | Matsunaga | B60K 6/442 |
| | | | | 73/114.01 |
| 2015/0375739 | A1 * | 12/2015 | Ohkubo | B60W 10/06 |
| | | | | 180/65.23 |
| 2017/0217423 | A1 * | 8/2017 | Aoki | B60W 20/40 |
| 2018/0178806 | A1 * | 6/2018 | Nozaki | B60W 50/14 |
| 2019/0135263 | A1 * | 5/2019 | Sato | B60K 6/46 |
| 2021/0123526 | A1 * | 4/2021 | Inoue | F16H 59/44 |
| 2022/0055610 | A1 * | 2/2022 | Takada | B60W 20/11 |
| 2023/0347866 | A1 * | 11/2023 | Hoshi | B60W 10/06 |

FOREIGN PATENT DOCUMENTS

| | | |
|---|---|---|
| JP | 2020131823 A | 8/2020 |
| JP | 2022084429 A | 6/2022 |

OTHER PUBLICATIONS

Liu et al., Hydraulic System Control for a Hybrid Continuously Variable Transmission Based on an Electric Oil Pump, 2018, IEEE, p. 10398-10410 (Year: 2018).*

Schier et al., Highly integrated electric drives for automotive application, 2015, IEEE, p. 1-6 (Year: 2015).*

Wi et al., Energy consumption of parallel type hybrid electric vehicle with continuously variable transmission using electric oil pump, 2018, IEEE, p. 1-7 (Year: 2018).*

Lequesne, Automotive Electrification: The Nonhybrid Story, 2015, IEEE, p. 40-53 (Year: 2015).*

Cho et al., Electric motors in vehicle applications, 1999, IEEE, pg., 1999, IEEE, p. 193-198 (Year: 1999).*

Charu et al., Emerging Energy-Efficient Technologies for Hybrid Electric Vehicles, 2007, IEEE, p. 1-15 (Year: 2007).*

He et al., Development of a Hybrid Electric Vehicle With a Hydrogen-Fueled IC Engine, 2006, IEEE, p. 1693-1703 (Year: 2006).*

* cited by examiner

CONTROL DEVICE FOR HYBRID VEHICLE

CROSS-REFERENCE TO RELATED APPLICATION

This application is based upon and claims the benefit of priority of the prior Japanese Patent Application No. 2023-085744, filed on May 24, 2023, the entire contents of which are incorporated herein by reference.

TECHNICAL FIELD

The present disclosure relates to a control device for a hybrid vehicle.

BACKGROUND

A hybrid vehicle is known that suppresses the occurrence of gear rattling noise caused by stopping and starting an engine using a motor (see, for example, Japanese Unexamined Patent Application Publication No. 2020-131823).

In the hybrid vehicle, an amount of hydraulic oil in a torque converter might decrease during the traveling of the vehicle in a motor traveling mode. This might cause a decrease in torque transmission efficiency of the torque converter at the time of engine start, resulting in a shortage of the driving force of the vehicle. Therefore, it is conceivable to supply the hydraulic oil into the torque converter by the oil pump during the traveling of the vehicle in the motor traveling mode, and further to stir the hydraulic oil in the torque converter by motoring the engine. However, when the engine is motored during the traveling of the vehicle in the motor traveling mode, noise and vibration might increase to give a driver a sense of discomfort.

SUMMARY

It is therefore an object of the present disclosure to provide a control device, for a hybrid vehicle, which eliminates shortage of driving force at a time of engine start without giving a driver a sense of discomfort.

The above object is achieved by a control device for a hybrid vehicle including an engine, a torque converter, a transmission, a motor, a mechanical oil pump, and a starter, the torque converter, the transmission, and the motor being provided in this order in a power transmission path from the engine to a drive wheel, the mechanical oil pump being driven by the engine and supplying hydraulic oil to the torque converter, the starter motoring the engine, the control device including: a traveling mode determination unit configured to determine whether or not a motor traveling mode is selected, the motor traveling mode being a state where the transmission interrupts power transmission between the torque converter and the motor; an acquisition unit configured to acquire a vehicle speed when the traveling mode determination unit makes an affirmative determination; a vehicle speed determination unit configured to determine whether or not the vehicle speed is within an allowable range in which noise and vibration are allowable when the engine is motored by the starter; and a control unit configured to control the starter to motor the engine when the vehicle speed determination unit makes an affirmative determination.

Also, the above object is achieved by a control device for a hybrid vehicle including an engine, a torque converter, a transmission, a motor, an electric oil pump, and a starter, the torque converter, the transmission, and the motor being provided in this order in a power transmission path from the engine to a drive wheel, the electric oil pump being driven by electric power and supplying hydraulic oil to the torque converter, the starter motoring the engine, the control device including: a traveling mode determination unit configured to determine whether or not a motor traveling mode is selected, the motor traveling mode being a state where the transmission interrupts power transmission between the torque converter and the motor; an acquisition unit configured to acquire a vehicle speed when the traveling mode determination unit makes an affirmative determination; a vehicle speed determination unit configured to determine whether or not the vehicle speed is within an allowable range in which noise and vibration are allowable when the engine is motored by the starter; and a control unit configured to drive the electric oil pump and control the starter to motor the engine when the vehicle speed determination unit makes an affirmative determination.

The control unit may be configured to set a target motoring rotation speed of the engine to a higher value as the vehicle speed is higher.

DETAILED DESCRIPTION

[Schematic Configuration of Hybrid Vehicle]

Figure 1:
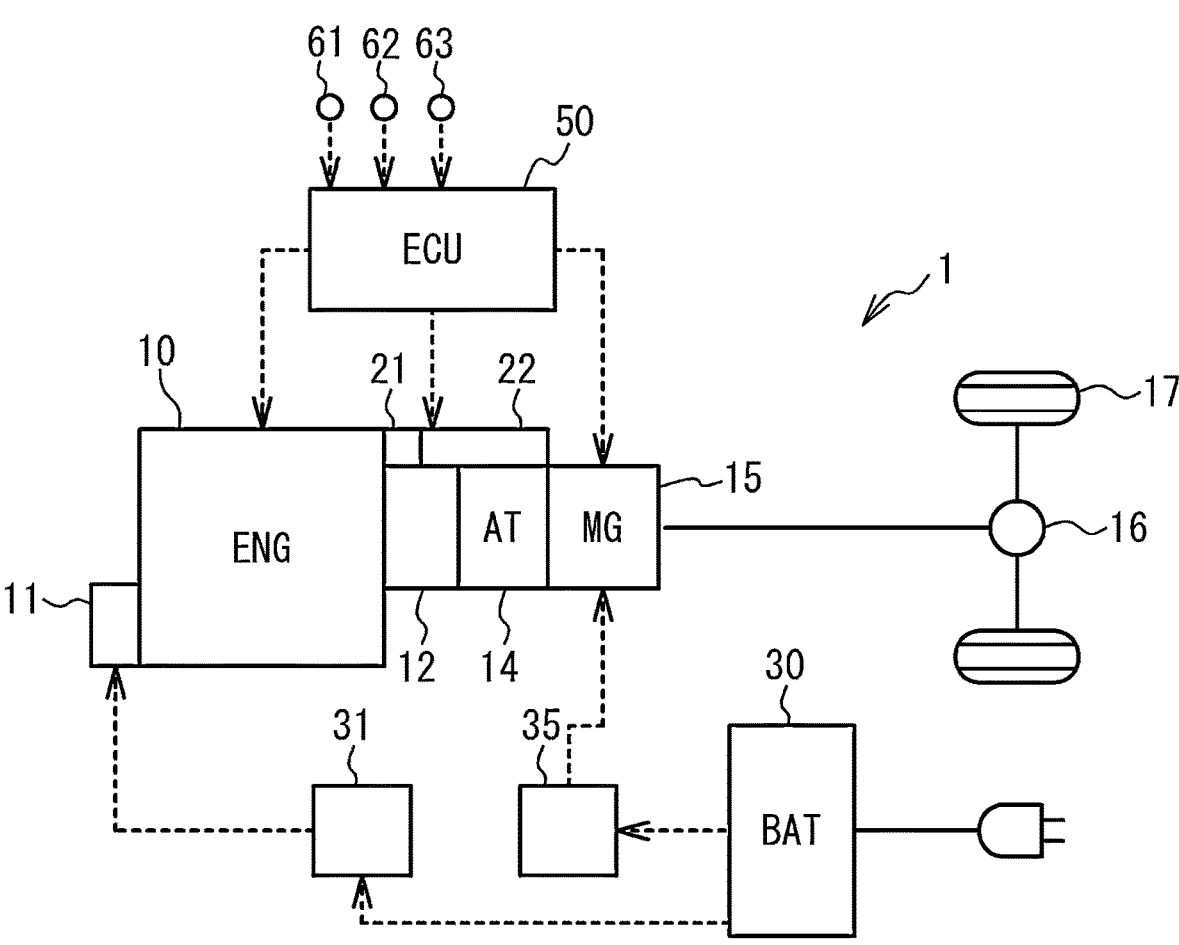
FIG. 1 is a schematic configuration view of a hybrid vehicle.

FIG. 1 is a schematic configuration view of a hybrid vehicle 1. The hybrid vehicle 1 is equipped with an engine 10 and a motor 15 as power sources for traveling. The engine 10 is a gasoline engine having a plurality of cylinders, but may be a diesel engine. A torque converter 12, an automatic transmission 14, the motor 15, and a differential gear 16 are provided in this order on a power transmission path from the engine 10 to drive wheels 17.

The engine 10 is provided with a starter 11. The starter 11 is connected to a battery 30 via an inverter 31. The starter 11 is a motor capable of motoring the engine 10. The electric power transmitted between the starter 11 and the battery 30 is adjusted by the inverter 31.

The motor 15 is connected to the battery 30 via an inverter 35. The motor 15 functions as a motor that generates a driving force of the vehicle in response to power supply from the battery 30. The motor 15 also functions as a generator that generates electric power for charging the battery 30 in response to power transmitted from the engine 10 and the drive wheels 17. The electric power transmitted between the motor 15 and the battery 30 is adjusted by the inverter 35. The battery 30 is a chargeable and dischargeable secondary battery such as a nickel-hydrogen battery or a lithium-ion battery. The battery 30 is capable of being charged by electric power from an external power supply. That is, the hybrid vehicle 1 is a so-called plug-in hybrid vehicle.

The torque converter 12 is a fluid coupling having a torque amplifying function. The automatic transmission 14 is a stepped transmission that switches a gear ratio in multiple stages.

The hydraulic pressure generated by a mechanical oil pump 21 is supplied to the torque converter 12 and the automatic transmission 14 via a hydraulic pressure control mechanism 22. The mechanical oil pump 21 is driven by the engine 10. The hydraulic pressure control mechanism 22 is provided with respective hydraulic circuits of the torque converter 12 and the automatic transmission 14, and various hydraulic control valves for controlling the hydraulic pressures thereof.

The hybrid vehicle 1 is provided with an electronic control unit (ECU) 50 as a control device for the hybrid vehicle. The ECU 50 includes a processing circuit that performs various processing related to the traveling control of the hybrid vehicle 1. The ECU 50 is an example of a control device, and functionally achieves a traveling mode determination unit, an acquisition unit, a vehicle speed determination unit, and a control unit, which will be described in detail later.

An ignition switch 61, a crank angle sensor 62, and a vehicle speed sensor 63 are connected to the ECU 50. The ignition switch 61 detects whether the ignition is turned on or off. The crank angle sensor 62 detects rotation speed of a crankshaft of the engine 10. The vehicle speed sensor 63 detects vehicle speed of the hybrid vehicle 1.

The ECU 50 controls the driving of the engine 10 and the motor 15. In particular, the ECU 50 controls the inverter 35 to adjust the amount of electric power transferred between the motor 15 and the battery 30, thereby controlling the torque of the motor 15. The ECU 50 controls the driving of the automatic transmission 14 through the control of the hydraulic pressure control mechanism 22.

The ECU 50 causes the hybrid vehicle 1 to travel in either a motor traveling mode or a hybrid traveling mode. In the motor traveling mode, the ECU 50 control the motor 15 to rotate the drive wheels 17 in a state where the power transmission between the torque convertor 12 and the motor 15 is interrupted by the automatic transmission 14. The state in which the power transmission is interrupted is achieved by a neutral state in which a plurality of engagement elements of the automatic transmission 14 are released. In the hybrid traveling mode, the ECU 50 rotates the drive wheels 17 at least with the power of the engine 10. For example, when the required driving force for the hybrid vehicle 1 is equal to or greater than a driving force threshold, the motor traveling mode is switched to the hybrid traveling mode. When a charge amount of the battery 30 is equal to or smaller than an electric power threshold value, the motor traveling mode is switched to the hybrid traveling mode.

As described above, in the motor traveling mode, the motor 15 is disconnected from the torque converter 12 and the automatic transmission 14. Therefore, a rotational load of the motor 15 is reduced, and the traveling distance in the motor traveling mode is ensured.

Figure 2:
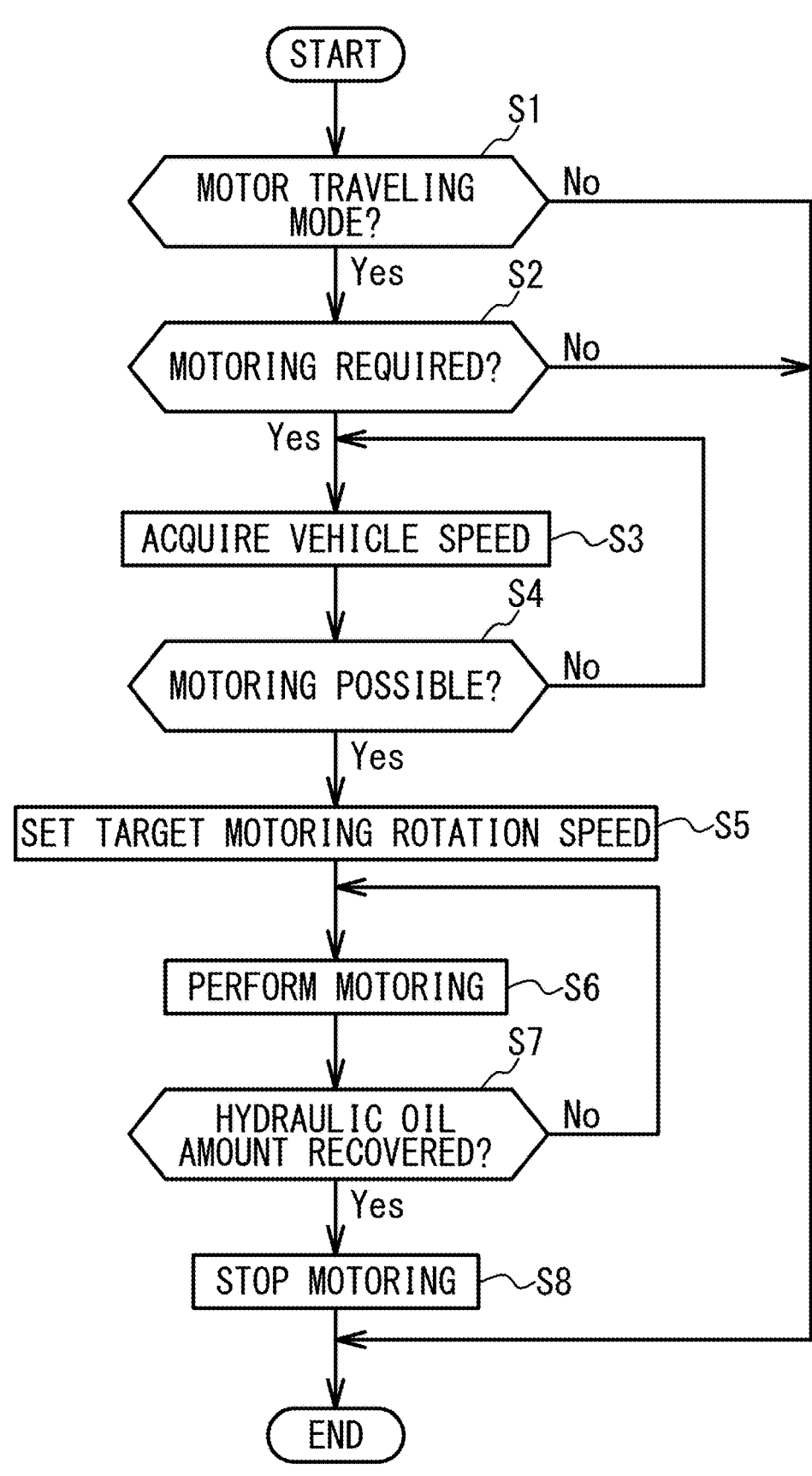
FIG. 2 is a flowchart illustrating motoring control.

FIG. 2 is a flowchart illustrating an example of motoring control. This control is repeatedly executed while the ignition is on. First, the ECU 50 determines whether the vehicle is traveling in the motor traveling mode or not (step S1). Step S1 is an example of a process executed by the traveling mode determination unit. If the determination result is No in step S1, the control ends.

If the determination result in step S1 is Yes, the ECU 50 determines whether or not there is a motoring request (step S2). The motoring request is made, for example, when a stop period of the engine 10 or a traveling period in the motor traveling mode is equal to or longer than a threshold. If the determination result is No in step S2, the control ends.

If the determination result is Yes in step S2, the ECU 50 acquires a vehicle speed based on a detection value of the vehicle speed sensor 63 (step S3). Step S3 is an example of a process executed by the acquisition unit.

Figure 3:
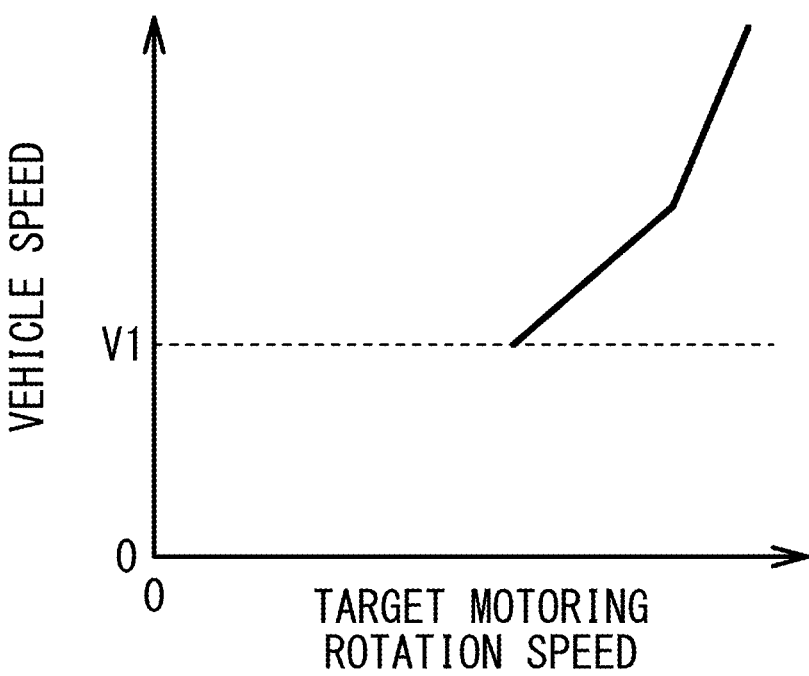
FIG. 3 is an exemplary view of a map defining a relationship between a vehicle speed and a target motoring rotation speed.

Next, the ECU 50 determines whether or not the motoring is possible based on the vehicle speed (step S4). For example, FIG. 3 is an exemplary view of a map that defines the relationship between a vehicle speed and a target motoring rotation speed. The target motoring rotation speed is a target rotation speed of the engine 10 when the engine 10 is motored by the starter 11. As illustrated in FIG. 3, the motoring is possible when the vehicle speed is equal to or higher than a speed V1. This is because, if the vehicle speed is lower than the speed V1, the background noise is small, and thus the driver might notice the noise or vibration due to the motoring. Therefore, the speed V1 is set in advance to a lower limit value of the vehicle speed at which the driver does not notice noise or vibration due to the motoring, based on experimental results, simulation results, or the like. The range in which the vehicle speed is equal to or higher than the speed V1 corresponds to an allowable range in which noise and vibration are allowable when the engine 10 is motored. Step S4 is an example of a process executed by the vehicle speed determination unit. If the determination result is No in step S4, step S3 is executed again.

If the determination result in step S4 is Yes, the ECU 50 sets a target motoring rotation speed with reference to FIG. 3 (step S5). The target motoring rotation speed illustrated in FIG. 3 is set to a maximum value of an allowable rotation speed at which the driver does not notice noise or vibration due to the motoring. Thus, the hydraulic oil is supplied into the torque converter 12 in a short time and stirred, and the driver is prevented from noticing noise and vibration due to the motoring. As illustrated in FIG. 3, the target motoring rotation speed is set to a higher value as the vehicle speed increases. This is because the background noise increases as the vehicle speed increases, and the driver is less likely to notice the increase in noise and vibration due to the motoring. Step S5 is an example of a process executed by the control unit. Next, the ECU 50 controls the starter 11 to motor the engine 10 such that the rotation speed of the engine 10 becomes the target motoring rotation speed (step S6). The motoring of the engine 10 drives the mechanical oil pump 21 to supply the hydraulic oil into the torque converter 12. Further, the torque converter 12 is driven by motoring of the engine 10, and the hydraulic oil is stirred in the torque converter 12. As a result, the hydraulic oil is sufficiently distributed in the torque converter 12. Therefore, a torque transmission efficiency of the torque converter 12 at the time of starting the engine 10 is ensured, and the shortage of the driving force of the hybrid vehicle 1 is solved. Step S6 is an example of a process executed by the control unit.

Next, the ECU 50 determines whether or not an amount of the hydraulic fluid in the torque convertor 12 is recovered (step S7). For example, when a time required for recovering the amount of the hydraulic oil by the motoring has elapsed from the start of motoring, it may be determined that the amount of the hydraulic oil is recovered. Further, it may be determined that the amount of the hydraulic oil is recovered when a detection value of a hydraulic gauge proportional to the amount of the hydraulic oil in the torque converter 12 is equal to or greater than a threshold value. If the determination result is No in step S7, step S6 is continued. If the determination result in step S7 is Yes, the ECU 50 stops the motoring of the engine 10 by the starter 11 (step S8).

As described above, the hydraulic oil is supplied into the torque converter 12 and stirred in the torque converter 12 during the traveling of the hybrid vehicle 1 in the motor traveling mode without giving the driver a sense of discomfort. Therefore, it is possible to solve the problem of insufficient driving force of the hybrid vehicle 1 at the time of starting the engine 10.

In the above embodiment, an electric oil pump may be provided instead of the mechanical oil pump 21. The electric oil pump is driven by electric power supply without being driven by the engine 10. The electric oil pumps are driven by a command from the ECU 50. Therefore, when the determination result in step S4 is Yes, the ECU 50 may drive the electric oil pump and control the starter 11 to motor the engine 10. Further, when the determination result in step S4 is Yes, the ECU 50 may drive the electric oil pump to complete the supply of the hydraulic oil into the torque convertor 12, and then may control the starter 11 to motor the engine 10. These controls are examples of the process executed by the control unit described above.

In the above embodiment, the target motoring rotation speed is set to the maximum value of the allowable rotation speed at which the driver does not notice noise or vibration due to the motoring, but the present disclosure is not limited thereto. For example, when the charge amount of the battery 30 is equal to or smaller than a threshold value, the target motoring rotation speed may be set to a value lower than the maximum value of the allowable rotation speed. This suppresses a decrease in the charge amount of the battery 30.

Although some embodiments of the present disclosure have been described in detail, the present disclosure is not limited to the specific embodiments but may be varied or changed within the scope of the present disclosure as claimed.

What is claimed is:

1. A control device for a hybrid vehicle including an engine, a torque converter, a transmission, a motor, a mechanical oil pump, and a starter, the torque converter, the transmission, and the motor being provided in this order in a power transmission path from the engine to a drive wheel, the mechanical oil pump being driven by the engine and supplying hydraulic oil to the torque converter, the starter motoring the engine, the control device comprising:

a traveling mode determination unit configured to determine whether or not a motor traveling mode is selected, the motor traveling mode being a state where the transmission interrupts power transmission between the torque converter and the motor;

an acquisition unit configured to acquire a vehicle speed from a vehicle speed sensor when the traveling mode determination unit makes an affirmative determination;

a vehicle speed determination unit configured to determine whether or not the vehicle speed is within an allowable range in which noise and vibration are allowable when the engine is motored by the starter; and a control unit configured to control the starter to motor the engine when the vehicle speed determination unit makes an affirmative determination.

2. A control device for a hybrid vehicle including an engine, a torque converter, a transmission, a motor, an electric oil pump, and a starter, the torque converter, the transmission, and the motor being provided in this order in a power transmission path from the engine to a drive wheel, the electric oil pump being driven by electric power and supplying hydraulic oil to the torque converter, the starter motoring the engine, the control device comprising:

a traveling mode determination unit configured to determine whether or not a motor traveling mode is selected, the motor traveling mode being a state where the transmission interrupts power transmission between the torque converter and the motor;

an acquisition unit configured to acquire a vehicle speed from a vehicle speed sensor when the traveling mode determination unit makes an affirmative determination;

a vehicle speed determination unit configured to determine whether or not the vehicle speed is within an allowable range in which noise and vibration are allowable when the engine is motored by the starter; and a control unit configured to drive the electric oil pump and control the starter to motor the engine when the vehicle speed determination unit makes an affirmative determination.

3. The control device for the hybrid vehicle according to claim 1, wherein the control unit is configured to set a target motoring rotation speed of the engine to a higher value as the vehicle speed is higher.

4. The control device for the hybrid vehicle according to claim 2, wherein the control unit is configured to set a target motoring rotation speed of the engine to a higher value as the vehicle speed is higher.

\* \* \* \* \*